(12) United States Patent
Koch (10) Patent No.: US 10,596,899 B2
(45) Date of Patent: Mar. 24, 2020

(54) FUEL TANK FILTER ASSEMBLY AND FUEL SYSTEM

(71) Applicant: Kenneth C. Koch, Christiansted, VI (US)

(72) Inventor: Kenneth C. Koch, Christiansted, VI (US)

(*) Notice: Subject to any disclaimer, the term of this patent is extended or adjusted under 35 U.S.C. 154(b) by 126 days.

(21) Appl. No.: 16/018,067

(22) Filed: Jun. 26, 2018

(65) Prior Publication Data
US 2019/0152313 A1    May 23, 2019

Related U.S. Application Data (60) Provisional application No. 62/590,258, filed on Nov. 22, 2017.

(51) Int. Cl.
| | | |
|---|---|---|
| *B60K 15/035* | (2006.01) | |
| *B60K 15/077* | (2006.01) | |
| *B60K 15/04* | (2006.01) | |
| *B60K 15/03* | (2006.01) | |
| *F02M 37/22* | (2019.01) | |

(52) U.S. Cl.
CPC ........ *B60K 15/03504* (2013.01); *B60K 15/04* (2013.01); *B60K 15/0406* (2013.01); *B60K 15/077* (2013.01); *B60K 2015/03236* (2013.01); *B60K 2015/0438* (2013.01); *B60K 2015/0496* (2013.01); *F02M 37/22* (2013.01)

(58) Field of Classification Search
CPC .............. B60K 15/03504; B60K 15/04; B60K 15/0406; B60K 15/077; B60K 2015/0438; B60K 2015/0496; B60K 2015/03236; F02M 37/22
See application file for complete search history.

(56) References Cited

U.S. PATENT DOCUMENTS

| | | | | |
|---|---|---|---|---|
| 5,578,221 | A * | 11/1996 | Janik ................... | B01D 35/143 210/767 |
| 8,268,170 | B2 * | 9/2012 | Core ..................... | B01D 29/21 210/232 |
| 10,024,282 | B2 * | 7/2018 | Niwa .................. | F02M 37/0029 |
| 2001/0004061 | A1 * | 6/2001 | Popoff .................. | B01D 27/07 210/235 |
| 2019/0016211 | A1 * | 1/2019 | Novak .................. | B60K 15/03 |
| 2019/0107089 | A1 * | 4/2019 | Bykowski .......... | F02M 37/0076 |

* cited by examiner

*Primary Examiner* — Michael C Zarroli
(74) *Attorney, Agent, or Firm* — Bruce A. Lev (57) ABSTRACT

A fuel tank filter assembly and fuel system designed to be used as fuel is initially added to a vehicle. A removable, and cleanable filter sock is provided comprised of mono filament capable of straining micro particles. A pressure release locking cap is also provided. The filter sock allows fuel to flow at a normal rate while still catching and thereby removing unwanted debris.

12 Claims, 7 Drawing Sheets

FUEL TANK FILTER ASSEMBLY AND FUEL SYSTEM

CROSS-REFERENCE TO RELATED APPLICATION

The present application is related to and claims priority from prior provisional application Ser. No. 62/590,258 filed Nov. 22, 2017 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of fuel filter devices and more specifically relates to a fuel tank filter which may be inserted and attached to a vehicles gas tank fuel neck prior to filling a vehicle with fuel.

2. Description of the Related Art

Anyone who has owned an automobile knows the concerns of filling a vehicle with improper gasoline. Gasoline can carry debris and particles that can harm a vehicle engine if not properly filtered. Vehicles commonly have fuel filters, but they can become overridden with debris from dirty fuel. As such, a need exists to properly filter fuel when filling a fuel tank.

Various attempts have been made to solve the above-mentioned problems such as those found in U.S. Pat. and Pub. Nos. U.S. Pat. No. 4,743,370 to Akira Mizusawa; U.S. Pat. No. 4,358,372 to Roger J. Lundquist; and U.S. Pat. No. 4,851,118 to Kazumasa Kurihara. This art is representative of fuel tank filter devices. None of the above inventions and patents, taken either singly or in combination, is seen to describe the invention as claimed.

Ideally, a filter for fuel should provide clean fuel for the vehicle engine to remove debris particles that would have a deleterious effect on the operation of the engine and, yet would operate reliably and be manufactured at a modest expense. Thus, a need exists for a reliable fuel tank filter and assembly system for filtering fuel while filling a fuel tank to avoid the above-mentioned problems.

BRIEF SUMMARY OF THE INVENTION

In view of the foregoing disadvantages inherent in the known fuel filter art, the present invention provides a novel fuel tank filter and assembly system. The general purpose of the present invention, which will be described subsequently in greater detail, is to provide an assembly and system for filtering fuel while filling a fuel tank.

The general purpose of the present invention, which will be described subsequently in greater detail, is to provide a fuel tank filter which will seal to the top edge of a fuel filter neck. The device will have a micro filter particle sock having a widened shape at the bottom to improve fuel flow therethrough.

The present invention holds significant improvements and serves as a fuel tank filter and assembly system for filtering fuel while filling a fuel tank. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

BRIEF DESCRIPTION OF THE DRAWINGS

The figures which accompany the written portion of this specification illustrate embodiments and method(s) of use for the present invention, a fuel tank filter assembly and fuel system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a fuel filter device and more particularly to a fuel tank filter assembly and fuel system for filtering fuel while filling a fuel tank as used to improve the performance of an engine relying on that fuel.

Generally speaking, the present invention is designed to improve the performance of a motor vehicle by removing a portion of particulate matter from the fuel as a user fills their tank.

Referring to the drawings by numerals of reference there is shown in FIG. 1-12, a fuel tank filter assembly 1. The fuel tank filter assembly 1 has a locking cap outer housing 2 which is adapted to be removably attached to a fuel tank filler neck 23. The outer housing has an upper portion 3 and a lower portion 4 best seen in FIG. 7. An outer rim 5 encompasses the upper portion 3 and lower portion 4 of the outer housing 2. An aperture 6 passes through the upper portion 3 and lower portion 4 and allows fuel to pass therethrough.

Figure 11:
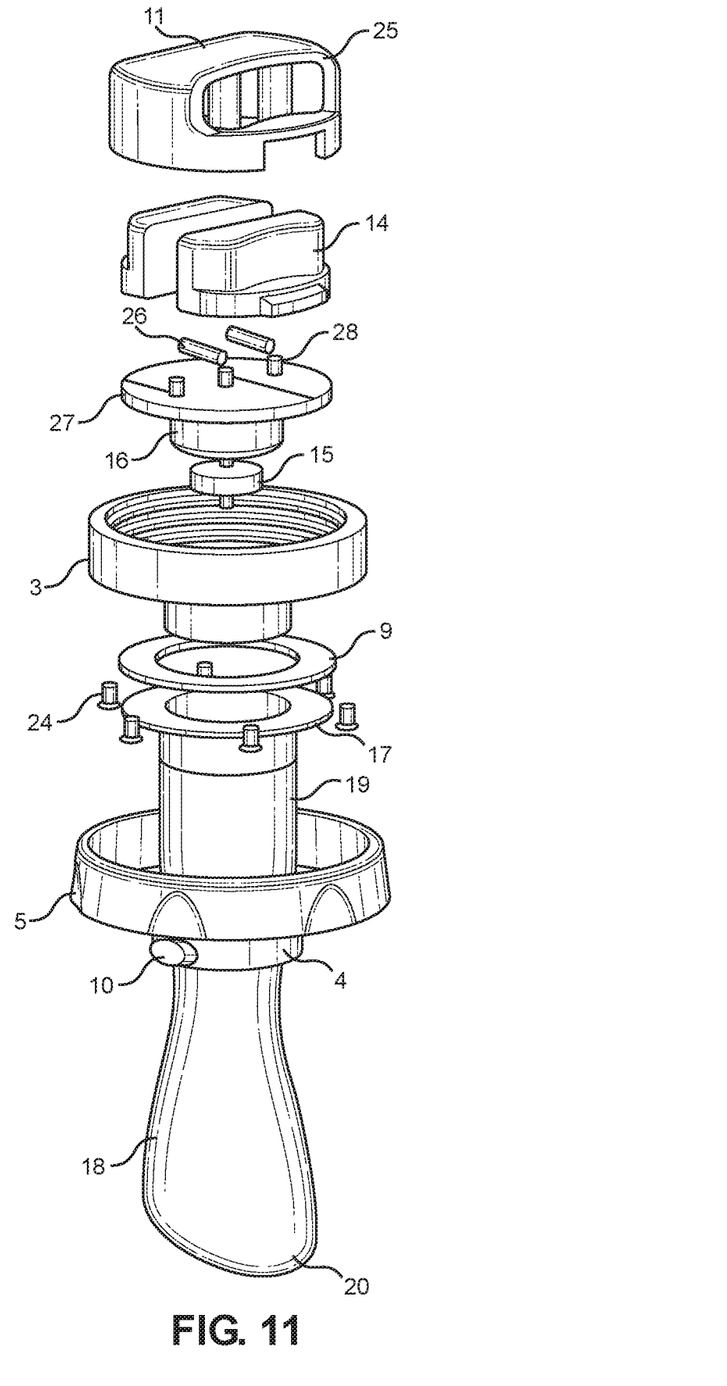
FIG. 11 is an exploded view of the fuel tank filter assembly according to an embodiment of the present invention of FIG. 1.
Figure 12:
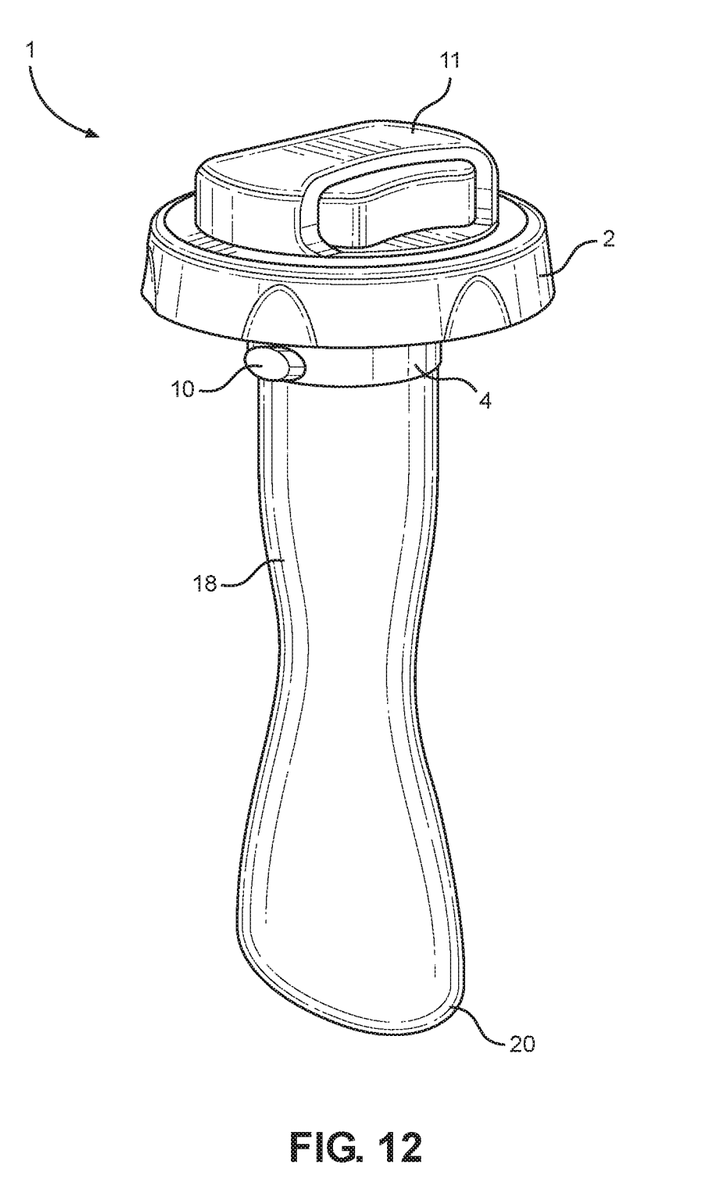
FIG. 12 is a perspective view of the fuel tank filter assembly with the pressure release locking cap on according to an embodiment of the present invention of FIG. 1.

A pressure release locking cap 11 as shown in FIG. 11 is removably attached to the upper portion 3 of the locking cap outer housing 2 and is adapted to selectively release gas pressure from within to prevent a fuel system connected to a fuel system from over pressuring due to the expansion of fuel gasses within a fuel tank.

Figure 4:
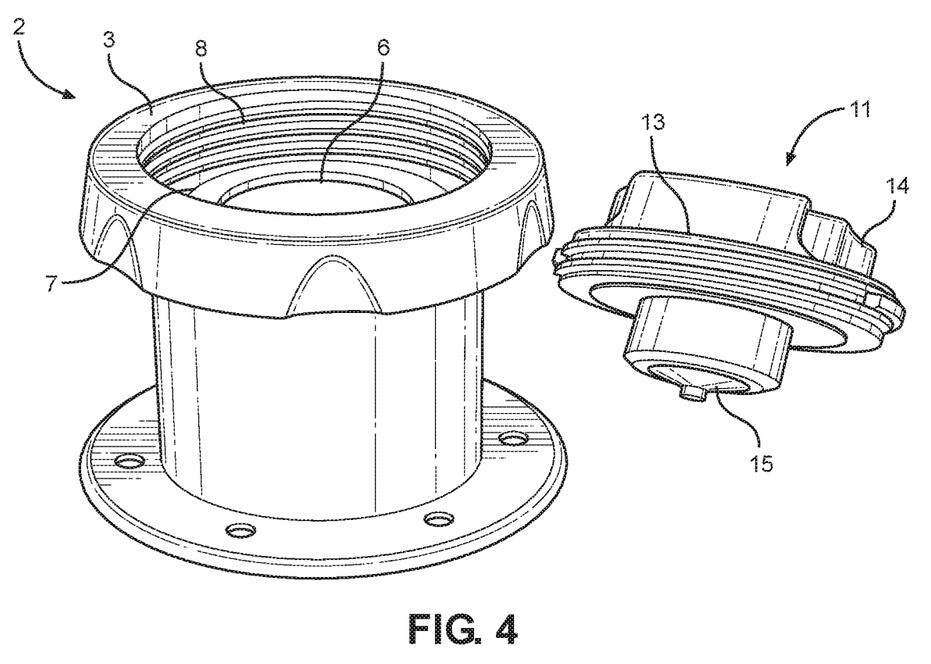
FIG. 4 is a perspective view illustrating the top of the fuel tank filter assembly with the pressure release locking cap off according to an embodiment of the present invention of FIG. 1.
Figure 7:
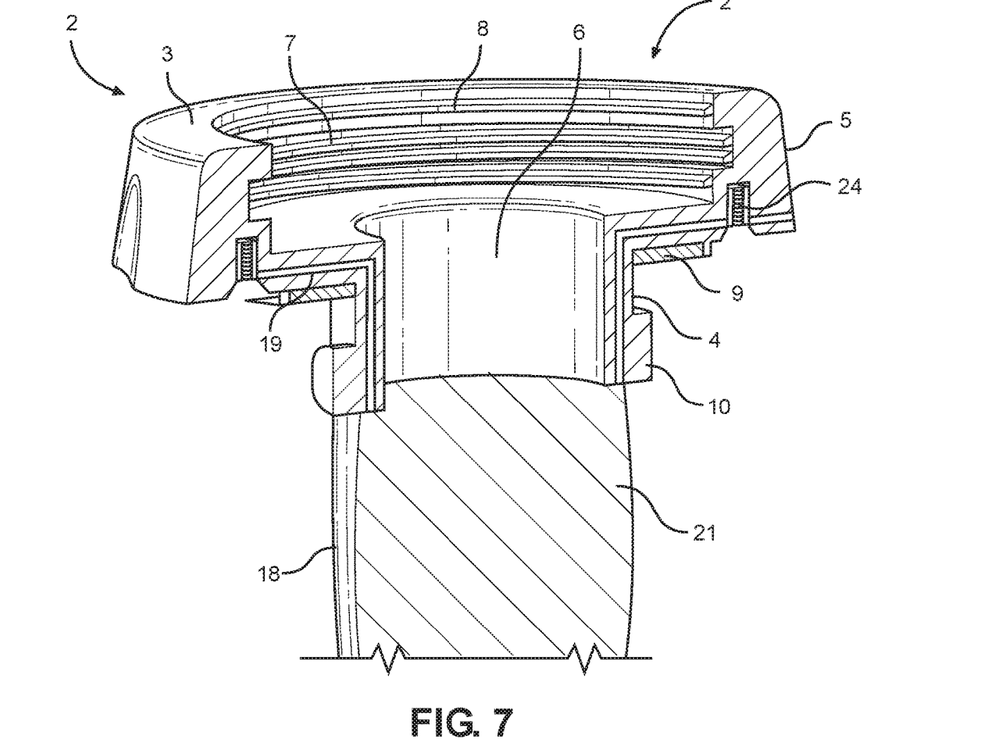
FIG. 7 is a cross sectional view of the fuel tank filter assembly illustrating the attachment of the filter-sock according to an embodiment of the present invention of FIG. 1.
Figure 8:
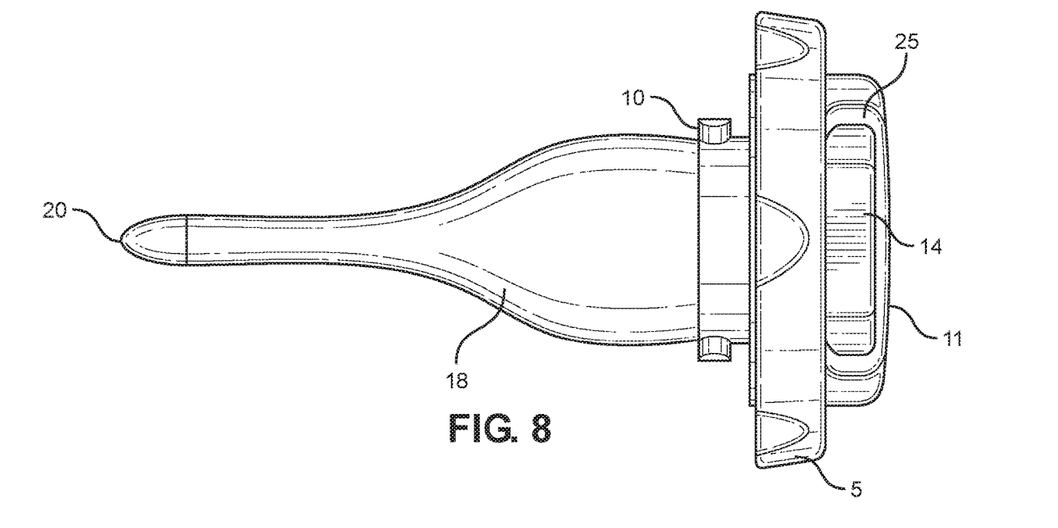
FIG. 8 is a side view of the fuel tank filter assembly illustrating the shape of the filter-sock and locking cap according to an embodiment of the present invention of FIG. 1.
Figure 9:
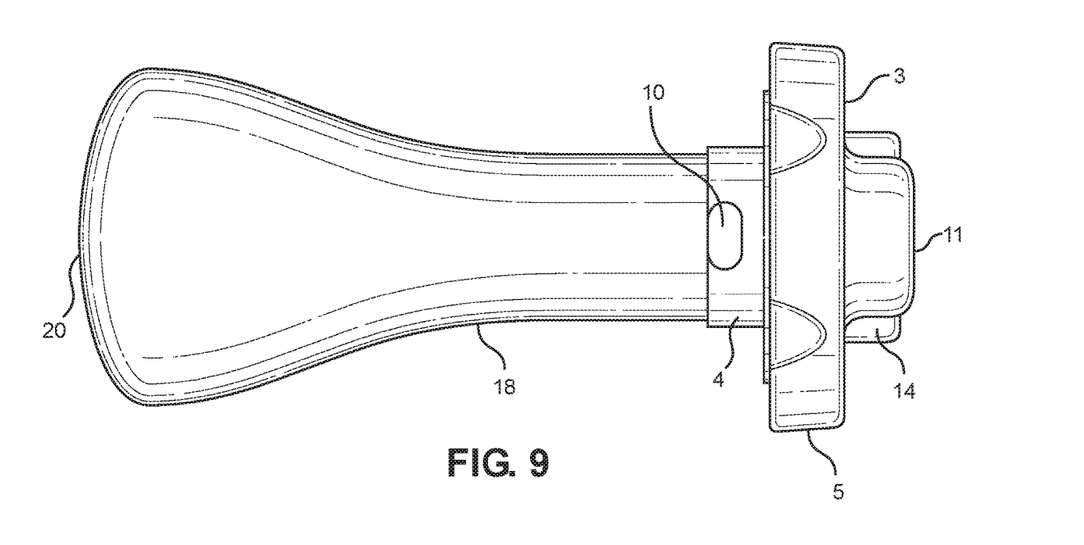
FIG. 9 is another side view of the fuel tank filter assembly particularly illustrating the flare at the distal end of the filter-sock according to an embodiment of the present invention of FIG. 1.
Figure 10:
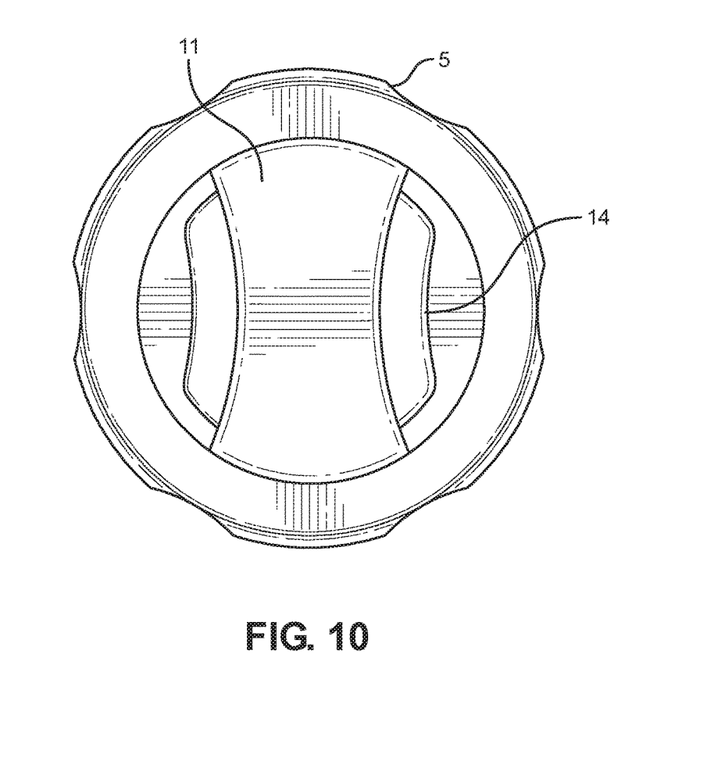
FIG. 10 is a top view of the locking cap of the fuel tank filter assembly according to an embodiment of the present invention of FIG. 1.

Threads 8 are provided around and upon an inner circumference 7 of locking cap outer housing 2 (FIGS. 4 and 7). In like manner, the pressure release locking cap 11 includes an outer circumferential surface 12 having threads 13 which interdigitate with the threads 8 of the locking cap outer housing 2 to removably attach the locking cap outer housing 2 and the pressure release locking cap 11 together.

The pressure release locking cap 11 includes a pinch lock 14 adapted to releasably engage with the locking cap outer housing 2 to thereby removably attach the pressure release locking cap 11 to the locking cap outer housing 2 and to also release pressure in cooperation with the pressure release valve described herein. The pinch lock 14 is biased outwardly into openings 25 in the pressure release locking cap 11 by springs 26 held in place by positioning screws 28 on plate 27 which holds the pressure release locking cap 11 together (FIG. 11). A pressure release valve 15 is also included in the pressure release locking cap 11, and is adapted to selectively release built up gas pressure.

The pressure release locking cap 11 also includes an adapter ring 16 adapted to be pressed against to create a seal between the pressure release locking cap 11 and a secondary sealing surface (not shown) of the fuel tank filler neck 23.

The pressure release locking cap 11 further includes a cap sealing ring 17. The locking cap outer housing 2 includes a housing sealing ring 9. The housing sealing ring 9 is adapted to releasably engage with the cap sealing ring 17 to form an airtight seal therebetween when the pressure release locking cap 11 is connected to the locking cap outer housing 2.

The locking cap outer housing 2 further includes at least one engagement member 10 which is adapted to releasably connect with a respective receiver member of the fuel tank filler neck 23 to thereby releasably connect the fuel tank filter assembly 1 to the fuel tank filler neck 23. The engagement member 10 is in the form of a positioning peg which is received within a receiver member 23A within the fuel tank filler neck 23.

Figure 5:
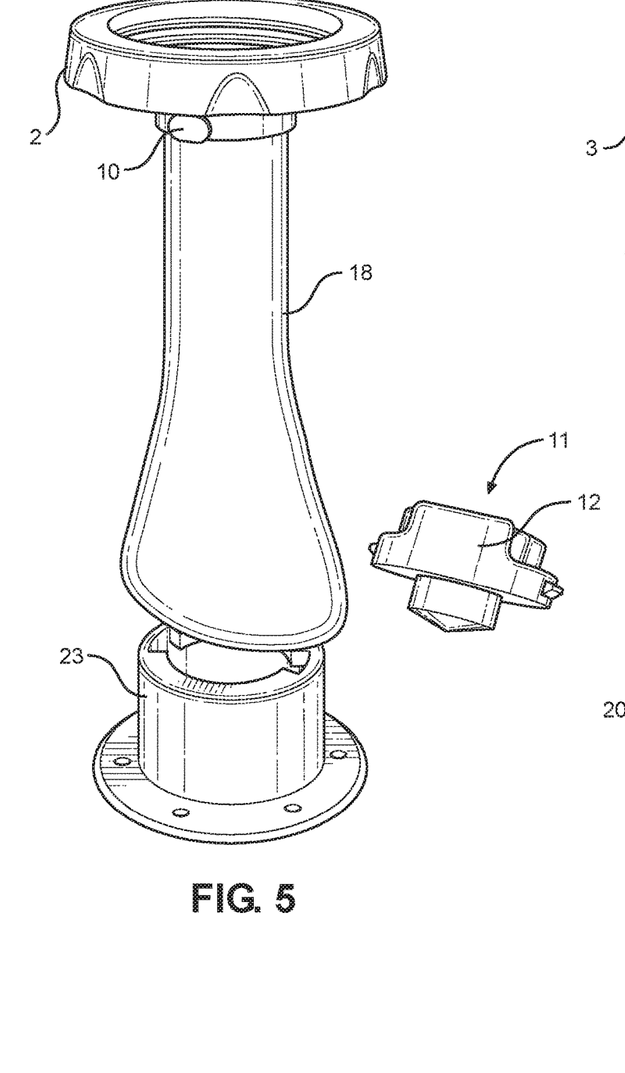
FIG. 5 is a partially exploded view of the fuel tank filter assembly according to an embodiment of the present invention of FIG. 1.

A fuel tank filter 18 is removably attached to the lower portion 4 of the locking cap outer housing 2 and is adapted to filter fuel passing therethrough (FIG. 5). To accommodate a typical nozzle at a fueling station, the fuel tank filter 18 has an elongated shape adapted to fit within and extend along the length of the fuel tank filler neck 23.

Figure 6:
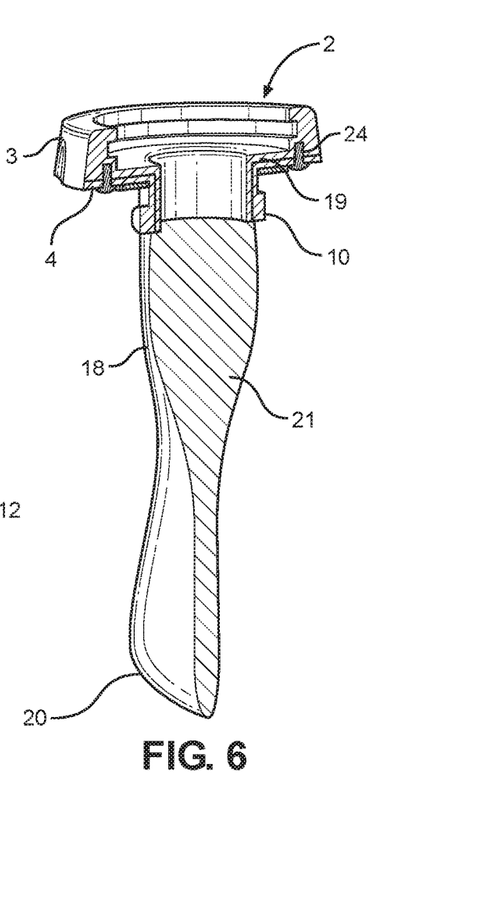
FIG. 6 is a cross sectional view of the fuel tank filter assembly minus the pressure release locking cap according to an embodiment of the present invention of FIG. 1.

More specifically, the fuel tank filter 18 has an elongated sock shape having a proximal end 19 and a distal end 20. The proximal end 19 is removably attach to the lower portion 4 of the locking cap outer housing 2. The proximal end 19 is held in place between the upper portion 3 and the lower portion 4 of the locking cap outer housing 2 by screws 24 as best seen in FIGS. 6-7. The fuel tank filter 18 can therefore be removed for cleaning by removing the screws 24 and then replacing them when cleaning is accomplished by washing with an appropriate cleaner. The distal end 20 (FIGS. 5-6) is adapted to be placed within the fuel tank filler neck 23.

The elongated sock shape of the fuel tank filter 18 forms an elongated interior volume 21. The distal end 20 has a width that is greater than the width of the proximal end 19 for the purpose of maintaining a constant flow rate of fuel into the fuel tank of a vehicle commensurate with the rate to which said fuel is released from a fuel pump at a fueling station.

Within the scope of this invention is the combination of a fuel system and a fuel tank filter assembly 1 as described above. The fuel system includes a fuel tank 22 and a fuel tank filler neck 23. The fuel tank filler neck 23 is attached to the fuel tank 22 and is adapted to allow fuel to pass therethrough.

The fuel tank filter 18 is formed from a mono-filament material which is adapted to be oil and chemical resistant to thereby its enhance life and performance.

The locking cap outer housing 2 and the pressure release locking cap 11 are formed from high strength aluminum.

The adapter ring 16 is formed from a material chosen from a list of materials consisting of rubber, silicone, plastic and ceramic.

Figure 1:
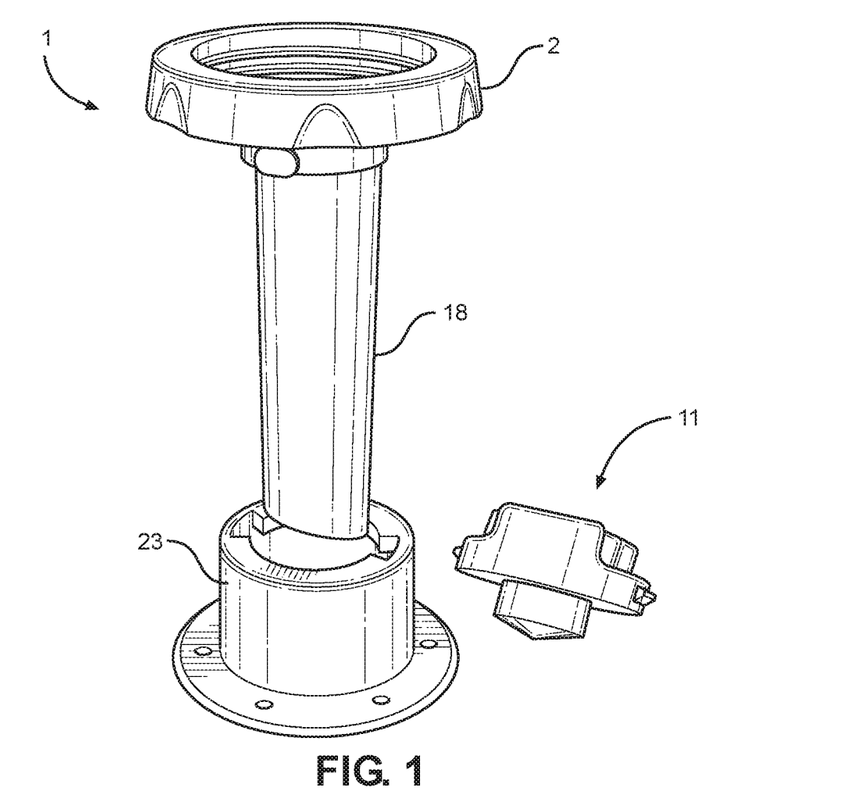
FIG. 1 shows a perspective view illustrating a fuel tank filter assembly being inserted into a fuel filler neck according to an embodiment of the present invention.
Figure 2:
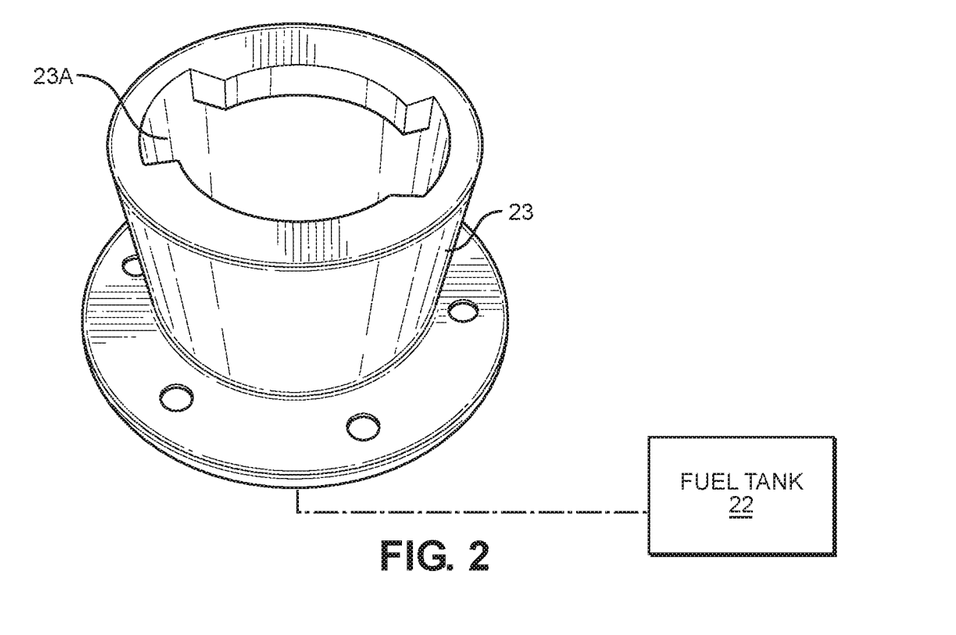
FIG. 2 is a perspective view illustrating a fuel filler neck which is schematically attached to a fuel tank according to an embodiment of the present invention of FIG. 1.
Figure 3:
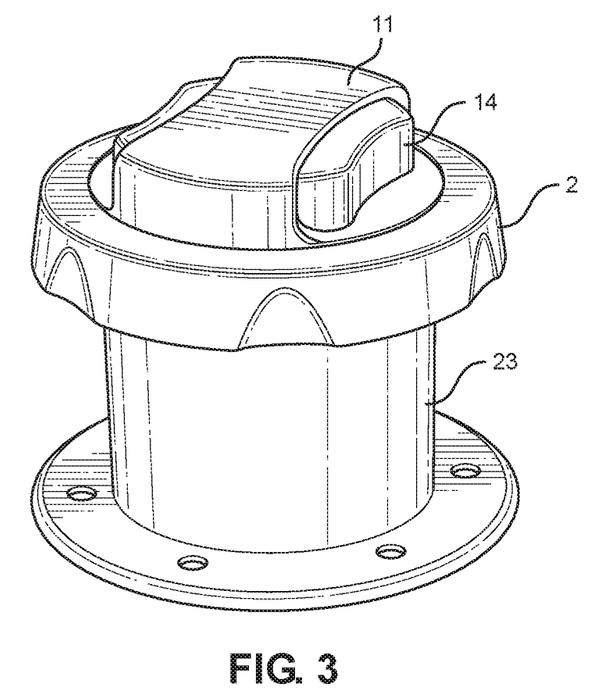
FIG. 3 is a perspective view illustrating the top of the fuel tank filter assembly with the pressure release locking cap on and attached to a fuel filler neck according to an embodiment of the present invention of FIG. 1.

The fuel tank filler neck 23 is based on a 2.3 inch fuel filler neck as shown in FIG. 2; however, other versions are envisioned within the scope of this invention to fit other fuel neck geometries.

What is claimed is:

1. A fuel tank filter assembly comprising:
    a locking cap outer housing including;
        an upper portion;
        a lower portion;
        an outer rim;
            wherein said outer rim is connected between said upper portion and said lower portion; and
        an aperture;
            wherein said aperture passes through said upper portion and said lower portion and is adapted to allow fuel to pass therethrough;
        wherein said locking cap outer housing is adapted to be removably attached to an existing fuel tank filler neck;
    a pressure release locking cap;
        wherein said pressure release locking cap is removably attached to said upper portion of said locking cap outer housing and is adapted to selectively release pressure from within said locking cap outer housing and prevent a fuel system connected to said fuel tank filler neck from over pressurizing; and
    a fuel tank filter;
        wherein said fuel tank filter is removably attached to said lower portion of said locking cap outer housing and is adapted to filter fuel passing therethrough; and
        wherein said fuel tank filter is formed having an elongated shape adapted to fit within and extend along a length of said fuel tank filler neck;
    wherein said locking cap outer housing includes threads around an inner circumferential surface thereon; wherein said pressure release locking cap includes threads around an outer circumferential surface thereon; and wherein said threads of said locking cap outer housing interdigitate with said threads of said pressure release locking cap to removably attach said pressure release locking cap to said locking cap outer housing.

2. The fuel tank filter assembly of claim 1, wherein said fuel tank filter is formed having an elongated sock shape having a proximal end adapted to removably attach to said lower portion of said locking cap outer housing, and a distal end adapted to be placed within said fuel tank filler neck; and wherein said elongated sock shape forms an elongated interior volume.

3. The fuel tank filter assembly of claim 2, wherein said distal end has a width that is greater than the width of said proximal end.

4. The fuel tank filter assembly of claim 2, wherein said fuel tank filter is formed from a mono-filament material.

5. The fuel tank filter assembly of claim 4, wherein said mono-filament material is adapted to be oil and chemical resistant.

6. The fuel tank filter assembly of claim 1, wherein said locking cap outer housing and said pressure release locking cap are formed from high strength aluminum.

7. The fuel tank filter assembly of claim 1, wherein said pressure release locking cap further includes a pressure release valve adapted to selectively release pressure from within said locking cap outer housing.

8. The fuel tank filter assembly of claim 1, wherein said adapter ring is formed from a material chosen from a list of materials consisting of rubber, silicone, plastic, and ceramic.

9. The fuel tank filter assembly of claim 1, wherein said pressure release locking cap further includes a cap sealing ring; and wherein said locking cap outer housing further includes a housing sealing ring adapted to releasably engage with said cap sealing ring and form an airtight seal therebetween when said pressure release locking cap is connected to said locking cap outer housing.

10. The fuel tank filter assembly of claim 1, wherein said locking cap outer housing further includes at least one engagement member adapted to releasably connect with a respective receiver member of said existing fuel tank filler neck to thereby releasably connect said fuel tank filter assembly with said existing fuel tank filler neck.

11. A fuel tank filter assembly comprising:
    a locking cap outer housing including;
        an upper portion;
        a lower portion;
        an outer rim;
            wherein said outer rim is connected between said upper portion and said lower portion; and
        an aperture;
            wherein said aperture passes through said upper portion and said lower portion and is adapted to allow fuel to pass therethrough;
        wherein said locking cap outer housing is adapted to be removably attached to an existing fuel tank filler neck;
    a pressure release locking cap;
        wherein said pressure release locking cap is removably attached to said upper portion of said locking cap outer housing and is adapted to selectively release pressure from within said locking cap outer housing and prevent a fuel system connected to said fuel tank filler neck from over pressurizing; and
    a fuel tank filter;
        wherein said fuel tank filter is removably attached to said lower portion of said locking cap outer housing and is adapted to filter fuel passing therethrough; and
        wherein said fuel tank filter is formed having an elongated shape adapted to fit within and extend along a length of said fuel tank filler neck;
    wherein said pressure release locking cap further includes a pinch lock adapted to releasably engage with said locking cap outer housing to thereby removably attach said pressure release locking cap to said locking cap outer housing.

12. A fuel tank filter assembly comprising:
    a locking cap outer housing including;
        an upper portion;
        a lower portion;
        an outer rim;
            wherein said outer rim is connected between said upper portion and said lower portion; and
        an aperture;
            wherein said aperture passes through said upper portion and said lower portion and is adapted to allow fuel to pass therethrough;
        wherein said locking cap outer housing is adapted to be removably attached to an existing fuel tank filler neck;
    a pressure release locking cap;

wherein said pressure release locking cap is removably attached to said upper portion of said locking cap outer housing and is adapted to selectively release pressure from within said locking cap outer housing and prevent a fuel system connected to said fuel tank filler neck from over pressurizing; and a fuel tank filter;
wherein said fuel tank filter is removably attached to said lower portion of said locking cap outer housing and is adapted to filter fuel passing therethrough; and
wherein said fuel tank filter is formed having an elongated shape adapted to fit within and extend along a length of said fuel tank filler neck;

wherein said pressure release locking cap further includes an adapter ring adapted to pressed against create a seal between said pressure release locking cap and a secondary sealing surface of said existing fuel tank filler neck.

\* \* \* \* \*